United States Patent
Ballard et al.

(10) Patent No.: US 9,875,026 B2
(45) Date of Patent: Jan. 23, 2018

(54) ACCESS COMMANDS INCLUDING EXPECTED MEDIA POSITIONS

(75) Inventors: Curtis C Ballard, Eaton, CO (US); Kevin Lloyd Jones, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 1256 days.

(21) Appl. No.: 13/171,888

(22) Filed: Jun. 29, 2011

(65) Prior Publication Data

US 2013/0007359 A1    Jan. 3, 2013

(51) Int. Cl.
*G06F 3/06* (2006.01)
*G11B 27/10* (2006.01)

(52) U.S. Cl.
CPC .......... *G06F 3/0605* (2013.01); *G06F 3/0655* (2013.01); *G06F 3/0682* (2013.01); *G11B 27/107* (2013.01)

(58) Field of Classification Search
CPC .... G06F 3/0671; G06F 3/0673; G06F 3/0674; G06F 3/0676; G06F 3/0677; G06F 3/0682; G06F 3/0686
See application file for complete search history.

(56) References Cited

U.S. PATENT DOCUMENTS

| | | | |
|---|---|---|---|
| 5,933,396 A * | 8/1999 | Hammar et al. | 369/30.43 |
| 6,073,209 A * | 6/2000 | Bergsten | 711/114 |
| 6,654,851 B1 | 11/2003 | McKean | |
| 6,832,287 B2 | 12/2004 | Beeston et al. | |
| 6,931,478 B2 | 8/2005 | Basham et al. | |
| 7,350,114 B2 | 3/2008 | Moody, II et al. | |
| 2002/0087783 A1* | 7/2002 | Leonhardt et al. | 711/111 |
| 2003/0200477 A1* | 10/2003 | Ayres | 714/2 |
| 2007/0180312 A1* | 8/2007 | Rhodes et al. | 714/13 |
| 2008/0140916 A1 | 6/2008 | Oh et al. | |

* cited by examiner

*Primary Examiner* — Reginald Bragdon
*Assistant Examiner* — Thanh Vo
(74) *Attorney, Agent, or Firm* — Hewlett Packard Enterprise Patent Department

(57) ABSTRACT

Techniques to send and receive access commands are provided. The access commands may include an expected media position. The expected media position may be compared to an actual media position.

20 Claims, 4 Drawing Sheets

ACCESS COMMANDS INCLUDING EXPECTED MEDIA POSITIONS

BACKGROUND

Sequential access storage devices are used to provide persistent storage of data. An example of such a device is a tape drive. The media used in a tape drive is a strip of magnetically sensitive material in the form of a tape. The tape is passed over a read/write head of the tape drive which then interacts with the magnetically sensitive material to read/write data. Data is read/written to the portion of the tape that is currently in contact with the read/write head as the tape is moved over the read/write head. In order to access data on a different portion of the tape, the tape must be rewound or forwarded to the desired position. A tape drive is a sequential access storage device because the read/write head cannot be moved to the desired position without traversing the portions of the tape between the current and desired position.

A sequential access storage device may be connected to a computer through a network. For example, in a Storage Area Network (SAN) or Network Associated Storage (NAS) system, a sequential access storage device may be connected to a network. Some typical networks used in SAN and NAS systems include Fiber Channel or Internet Protocol networks. The computer may also be connected to the network. When the computer needs to access the sequential access storage device to read or write data, the computer communicates with the sequential access storage device over the network.

DETAILED DESCRIPTION

Figure 1:
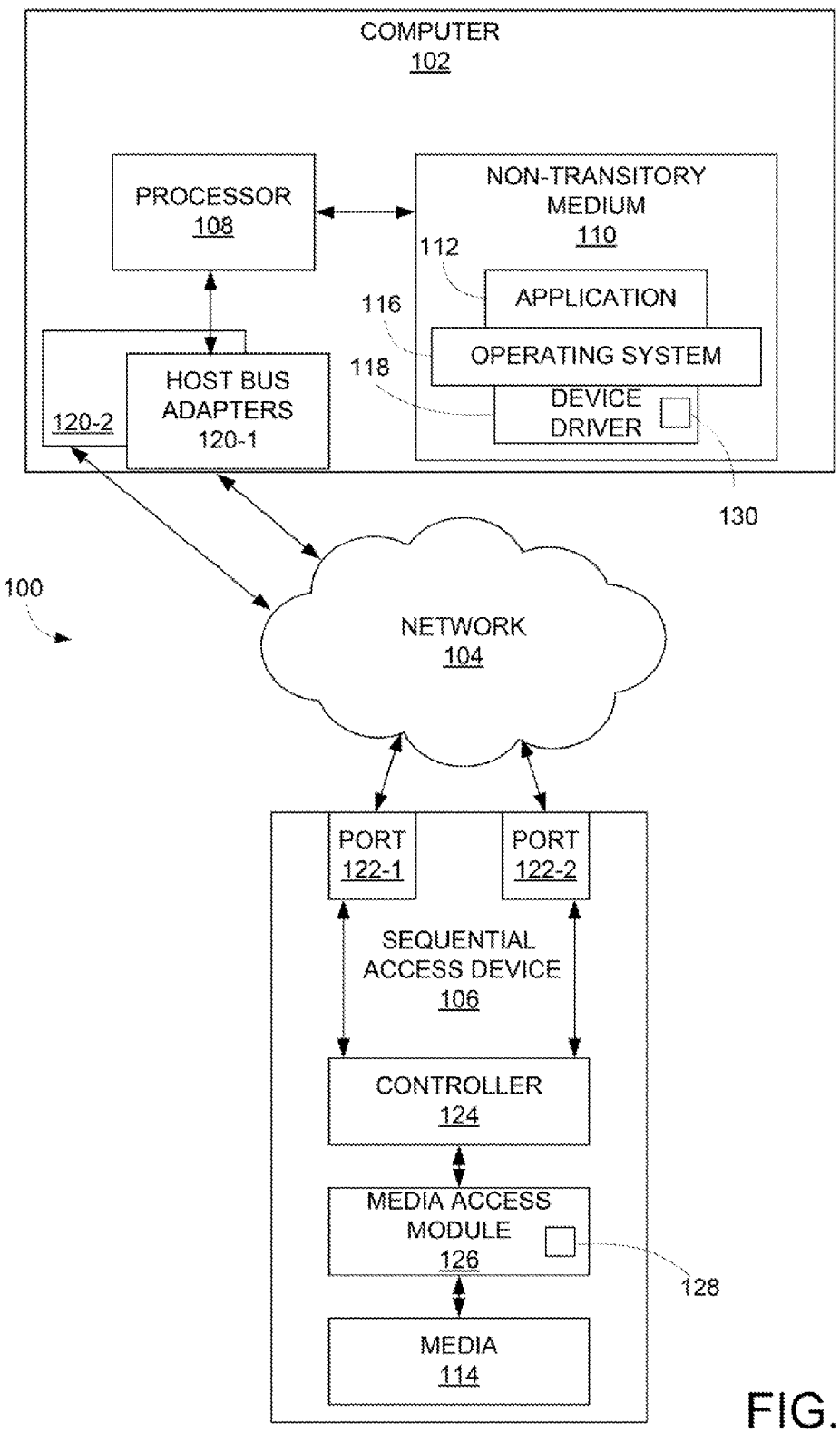
FIG. 1 is a high level diagram showing an example of a system which may be used to recover from communications failures between a computer and a sequential access storage device.

A remote storage system may include a computer connected to a remote storage device through a network. The computer may access the remote storage device through the use of commands that are sent over the network. A device driver on the computer may generate commands to access the remote storage device. For example, there may be commands to read or write data to or from the media of the storage device. In addition, both the computer and the remote storage device may have multiple interfaces connected to the network allowing for multiple communications paths between the computer and the remote storage device. Thus, if one communications path fails, it may be possible to resume communications using an alternate path.

If a communications path fails while a command is in progress, switching to an alternate communications path or resending the command over the same communications path, may require that failed command be recovered to ensure that the system remains in a stable state. For example, if a command to write data to the remote storage device fails, it is necessary to ensure that the data in the write command is actually written to the storage device and that it is written to the correct position on the media. If the storage device is a random access device, such recovery is relatively straight forward, because device drivers for a random access device generally include media position information in every command.

For example, a disk drive is a type of random access storage device which uses a magnetically sensitive disk as the storage media. Commands sent to a disk drive include the position on the disk where data should be accessed. The disk drive will position the read/write head of the drive to the position specified in the command. If a command fails, the command can simply be resent over an alternate communications path. The disk drive will execute the command at the media position specified in the command. Thus, there is no worry that the command is executed in an incorrect media position, as the correct media position is specified in the command itself.

The recovery described above for a random access device may not be effective for a sequential access storage device. A sequential access storage device has characteristics that differ from a random access device. One such characteristic is that the media position is not included in commands sent by the device driver to the sequential access storage device. Rather, an application or operating system that is accessing the sequential access storage device is responsible for sending commands to correctly position the media prior to reading or writing data. Unlike a random access device, a sequential access storage device cannot jump from one position on the media to a different position, thus the media is first properly positioned before a read or write command is issued. The device driver converts commands to the protocol that is used by the sequential access storage device but otherwise relies on the application or operating system to ensure the media is properly positioned.

Problems in recovering commands may arise when a command to a sequential access storage device fails. For example, a command may be issued by the device driver to write a certain number of bytes to the media. As mentioned above, the command from the device driver does not include media position information. In normal operation, the sequential access storage device will begin writing the received data as the media is moved underneath the read/write head. Upon completion, the sequential access storage device will notify the device driver of successful completion of the command.

However, if there is a failure of the command, the media may be left in an indeterminate position. For example, the communications path to the sequential access storage device may fail immediately after the write command is sent, but before any data is sent. Thus, no data is received by the storage device, and the media remains in the initial position. At the other end of the spectrum, the communications path may fail after all data is written, but before a response indicating a successful completion is sent to the device driver. The result of this type of failure is that the media is now in the same position as it would have been had the command completed successfully. A third possibility is that the command fails after some, but not all, of the data has been written to the media. Such a failure would leave the media in a position somewhere between the initial position and the successfully completed position.

Recovery from such a failure cannot be achieved by simply resending the command. Although such recovery may work in the case where no data was written and the media remains in the original position, resending the command will not work in the other cases, as the actual position of the media is not known. Furthermore, the device driver has no way of knowing what type of failure has occurred and thus does not know the current position of the media. Frequently querying the sequential access storage device for the current media location adds additional overhead and may reduce the rate at which data may be accessed on the sequential access storage device.

In addition, the device driver typically is not aware of the location on the media where data will be written because the actual location on the media where the data is written may only be known to the sequential access storage device itself. Thus the device driver would not be able to reposition the media to the correct position without additional interaction with the application and/or sequential access storage device. This additional interaction may also increase overhead and may reduce the rate at which data may be accessed on the sequential access storage device.

The present disclosure provides examples of systems and methods that allow a sequential access storage device driver to independently recover from failed commands while at the same time minimizing the amount of additional development effort required by manufacturers of sequential access storage devices. No additional development effort may be needed for existing applications and operating systems. These beneficial results are achieved by maintaining an expected media position within the device driver. The expected media position is calculated by the device driver and reflects the device driver's view of the current position of the media. Upon successful completion of a command, the device driver will recalculate the expected position based on the command that was just completed.

For example, the expected media position may indicate that the media is currently at a certain logical block address of the media. A command may be issued to write two logical blocks of data to the media. Upon successful completion of the command, the new expected media position would be the initial position plus the two blocks of data that were just written. Thus, the device driver is able to calculate an expected media position without further input from the application, operating system, or sequential access storage device.

The device driver may include the expected media position in a command that is sent to the sequential access storage device. Many command sets for interfacing with a sequential access storage device allow for a device driver to include extensions in a command and the expected media position can be included as an extension to existing commands. Alternatively, an existing command set could be duplicated and the expected media position added to the duplicate command set, resulting in a new command set. The processing of the new command set will be very similar to the original command set, with slight modifications that are explained below. In either case, sending the expected media position to the sequential access storage device may only need minimal amounts of development effort on the part of sequential access storage device manufacturers.

The sequential access storage device may implement the ability to compare the expected media position received in a command with the actual media position. The sequential access storage device may already maintain the actual media position as part of standard operation, so no additional development effort may be required to obtain the actual media position. Upon comparison, there are two possible outcomes. In the normal case, the expected and actual media positions match. In the case of a match, the command is processed just as it would have been absent the systems and methods described herein. In the case of a mismatch of the expected and actual media positions, the sequential access storage device will send a response to the device driver indicating an error and will not execute the command. The error indication may be included as an extension to an existing response in the command set or as a new response. In either case, the only new functionality on the sequential access storage device is the ability to return an error if the expected and actual media positions do not match.

In operation, a command may fail due to failure of a communications path between the computer and the sequential access storage device. The device driver may be aware of multiple communications paths between the computer and the sequential access storage device. The device driver, acting independently, may switch to a different communications path and resend the command including the position the media was expected to be in at the time of the command that failed. If no error response is received, the media is in the expected position, and the command is processed normally. If an error response is received, this indicates that the media is not positioned where the device driver believes the media is positioned. The media should be returned to the expected media position prior to re-executing the command. By utilizing the expected media position, the device driver may be able to independently switch to an alternate communications path and recover a failed command. Recovery of the failed command may be beneficially isolated to the device driver and may require no interaction with other components of the system.

Recovery of failed commands at the device driver level provides for numerous benefits. One benefit is that recovery of the failed command is isolated within the device driver. Other components of the system, such as the operating system and application, are relieved of the responsibility of recovering from command failures that can be better handled at the level of the device driver. As another benefit, the device driver is able to continuously confirm the actual position of the media because any mismatch between the actual and expected positions can be quickly detected and resolved. Yet another benefit is that the example systems methods presented below require minimal development on the sequential access storage device. The storage device need only compare a media position received in a command with an already known actual media position and if they do not match, respond with an error. No additional development is required from the perspective of the sequential access storage device. Furthermore, all other development effort may be isolated to the device driver.

FIG. 1 is a high level diagram showing an example of a system 100 which may be used to recover from communications failures between a computer 102 and a sequential access storage device 106. The system 100 includes a computer 102 that may communicate with a sequential access storage device 106 over a network 104. The computer may include a processor 108 which is coupled to a non-transitory medium 110. The processor 108 may read instructions stored in the non-transitory medium 110 and execute those instructions to allow the computer 102 to provide the functionality defined by the instructions. For example, the non-transitory medium 110 may include a set of instructions which together form an application 112 that provides the computer 102 with some desired functionality.

One type of functionality provided by an application 112 may be the ability to read data from and write data to a sequential access storage device 106. Generally, an application is not concerned with the low level details of the operation of the storage device. For example, the application 112 has no need to be aware of the communications path that the data will traverse on the way to/from the storage device or the position on the media 114 where the data will be read from or written to.

In order to isolate the application 112 from the low level operational details of the storage device, the non-transitory medium may contain a set of instructions which together form an operating system 116. The operating system 116 may have many responsibilities, including providing an application programming interface (API) through which the application 112 may access storage devices. For example, to write data to a storage device, the application 112 provides the data to the API with an indication that the data should be written. Likewise, to retrieve data from the storage device, the application 112 provides the API with an indication that the data is to be read and provided to the application. The low level operating details of interacting with the storage device are hidden from the application 112 through the use of an API provided by the operating system 116.

The operating system 116 may then access the storage device to carry out the commands received through the API. For example, the operating system 116 may wish to write the data received from the application 112 to the media 114 starting from the current position of the media. The command sequence necessary to execute this operation may vary based on the communications protocol used to communicate with the sequential access storage device 106. A sequential access storage device 106 using the Small Computer Systems Interface (SCSI) protocol requires a different command sequence than one connected using the High Performance Parallel Interface (HPPI) protocol. In many cases devices from different manufacturers may claim to support the same standard protocol, yet require different command sequences for proper operation, due to different interpretations of the standard protocol.

The non-transitory medium 110 may contain a set of instructions which together form a device driver 118. Just as the application 112 is isolated from low level operational details of storage devices through the use of an API, so too can the operating system 116 be shielded from some of the low level operational details of storage devices through the use of a device driver 118. The device driver 118 may receive commands from the operating system in a uniform manner and then convert those commands to command sequences necessary for accessing a specific device. Different device drivers 118 may be provided for each communications protocol and for different manufacturers. The operations of the device driver 118 will be described in further detail below.

The processor 108 may also be coupled to one or more host bus adapters. As shown in FIG. 1, the computer 102 contains two host bus adapters 120-1,2, however this is for purposes of description only. Any number of host bus adapters 120 is possible. Each host bus adapter 120-1,2 may provide an independent interface to the network 104. If one of the host bus adapters 120-1,2 should happen to fail, the remaining host bus adapter may continue to provide the computer 102 with connectivity to the network 104. In other words, the computer 102 may communicate with the network 104 through multiple paths.

The network 104 may allow devices connected to the network to communicate with each other. Many different types of networks 104 are available. For example, one type of network that is commonly used to connect computers and storage devices is a Fiber Channel network. Another common type of network is an Internet Protocol (IP) network. IP networks can include the public internet, private local area networks, private wide area networks, or combinations thereof. The network 104 may allow the computer 102 to communicate with the sequential access storage device 106. Any type of network that enables such communication is suitable.

Also connected to the network 104 may be a sequential access storage device 106. The sequential access storage device 106 may be connected to the network 104 through multiple ports 122-1,2. The ports 122-1,2 may provide interfaces which allow the sequential access storage device 106 to communicate with the network 104. If one of the ports 122-1,2 should fail, communications with the network 104 may still be maintained using the other port. The sequential access storage device 106 may also contain a controller 124. The controller 124 may receive commands sent by the computer 102 over the network 104 and execute those commands.

The controller 124 may also be coupled to a media access module 126. The media access module 126 may receive commands that require operation on the physical media 114. For example, the controller 124 may receive a command to position the media 114 to a certain location. The controller 124 may then command the media access module 126 to move the media 114 to the specified location. The media access module 126 may move the media 114 to the specified location. The media access module 126 will maintain data regarding the actual position of the media 114 in an actual media position 128 data field. The actual media position 128 is treated as the authoritative position of the media 114 as the media access module 126 has the most direct control over the position of the media.

Before describing operation of the system 100 it may be useful to identify a subset of the commands that may be sent to the sequential access storage device 106. The subset of commands will be referred to as access commands. Access commands are those commands where the initial position of the media 114 prior to the command must be known to ensure proper operation. For example, a command to write a certain number of bytes of data to the media 114 is an access command because the initial position of the media 114 will determine where the data is written. Likewise, a command to read a certain number of bytes of data from the media 114 is also an access command, because the data read is dependent on the initial position of the media.

In contrast, commands that are not access commands are not dependent on the initial position of the media for successful completion. For example, a command to move the media 114 to the beginning of the media (e.g. rewind a tape) or to some specific location on the media does not depend on the initial position of the media. The access commands and other commands will be described in further detail below with respect to operation of the system 100.

In operation, an application 112 executing on a computer 102 may desire to write data to media 114 on a sequential access storage device 106. The application may send the data to an API provided by an operating system 116 executing on the computer 102. The operating system 116, or operating system in conjunction with the application 112, may determine the physical location on the media 114 where the data should be written. The operating system 116 may then send a command to a device driver 118 executing on the computer 102 to move the media 114 to the desired position.

The device driver 118 may receive the command to move the media 114 and generate the appropriate command to send to a sequential access storage device 106. The device driver 118 may send the command to the sequential access storage device 106 through one of the host bus adapters 120-1,2, the network 104, and one of the ports 122-1,2. The particular adapter and port used may define communications path. For example, a communication that starts from the first host bus adapter 120-1, travels through the network 104, and then arrives at port 122-1 may have traveled over a first communications path. A communication that starts from the first host bus adapter 120-1, travels through the network 104, and then arrives at port 122-2 may have traveled over a second communications path.

The device driver 118 may maintain an expected media position 130. The expected media position 130 is the position where the device driver 118 currently believes the media 114 is located. The expected media position 130 is calculated by the device driver 118 based on the commands that are sent to the sequential access storage device 106. Use of the expected media position 130 will be described in further detail below.

The controller 124 of the sequential access storage device 106 may receive the command to move the media 114 via the first communications path. The controller 124 may command the media access module 126 to move the media 114 to the desired position. The media access module 126 may move the media to the requested position, update the actual media position 128 to reflect the move, and respond to the controller 124. Upon successful completion, the controller 124 may send a response indicating success back to the device driver 118 through the first communications path. Upon receipt of the response, the device driver 118 may update the expected media position 130 to indicate that the media 114 is now expected to be positioned at the desired location. The device driver 118 may inform the operating system 116 that the media positioning command was successful.

The operating system 116 may send the data from the application 112 as well as a command to write the data to the device driver 118. The device driver 118 may send a command to write the data to the sequential access storage device 106. The command to write the data may include the expected media position 130. As mentioned above, some commands, such as write commands, are classified as media access commands because the successful completion of the command depends on the current position of the media 114. The expected media position 130 may be included in any command that is classified as a media access command. In some implementations, the expected media position 130 may be included in all commands, including those that are not classified as media access commands.

The write command may be received by the controller 124 through the first communications path. The controller 124 may then compare the expected media position 130 that was included in the write command with the actual media position 128. If the expected and actual media positions are the same, the controller 124 and the media access module 126 may write the data to the media 114. The actual media position 128 will be updated to reflect the positions of the media 114 after the write has completed. The controller 124 will then send a response to the device driver 118 over the first communications path indicating that the command completed successfully.

Upon receipt of the successful completion response from the controller 124, the device driver 118 will then calculate the new expected position 130 based on the command that just completed. For example, in the case of a write command, the device driver 118 knows how much data was written because this information was provided by the operating system 116 when the write command was issued. The device driver 118 is able to calculate how far the media 114 would need to move to write the amount of data specified by the operating system 118. Thus, the device driver 118 is able to compute the new expected media position 130 based on the previous position and the amount of data written. What should be understood is that the expected media position 130 is calculated by the device driver 118 independent of the sequential access storage device 106.

In some cases, the write command may not complete successfully. For example, if the expected media position 130 and the actual media position 128 do not match, the controller 124 will return an error response. As another example, the communication path between the computer 102 and the sequential access storage device 106 may fail, such that the command or the response is never received. Recovery from these types of failure will be described with respect to FIG. 2.

Figure 2:
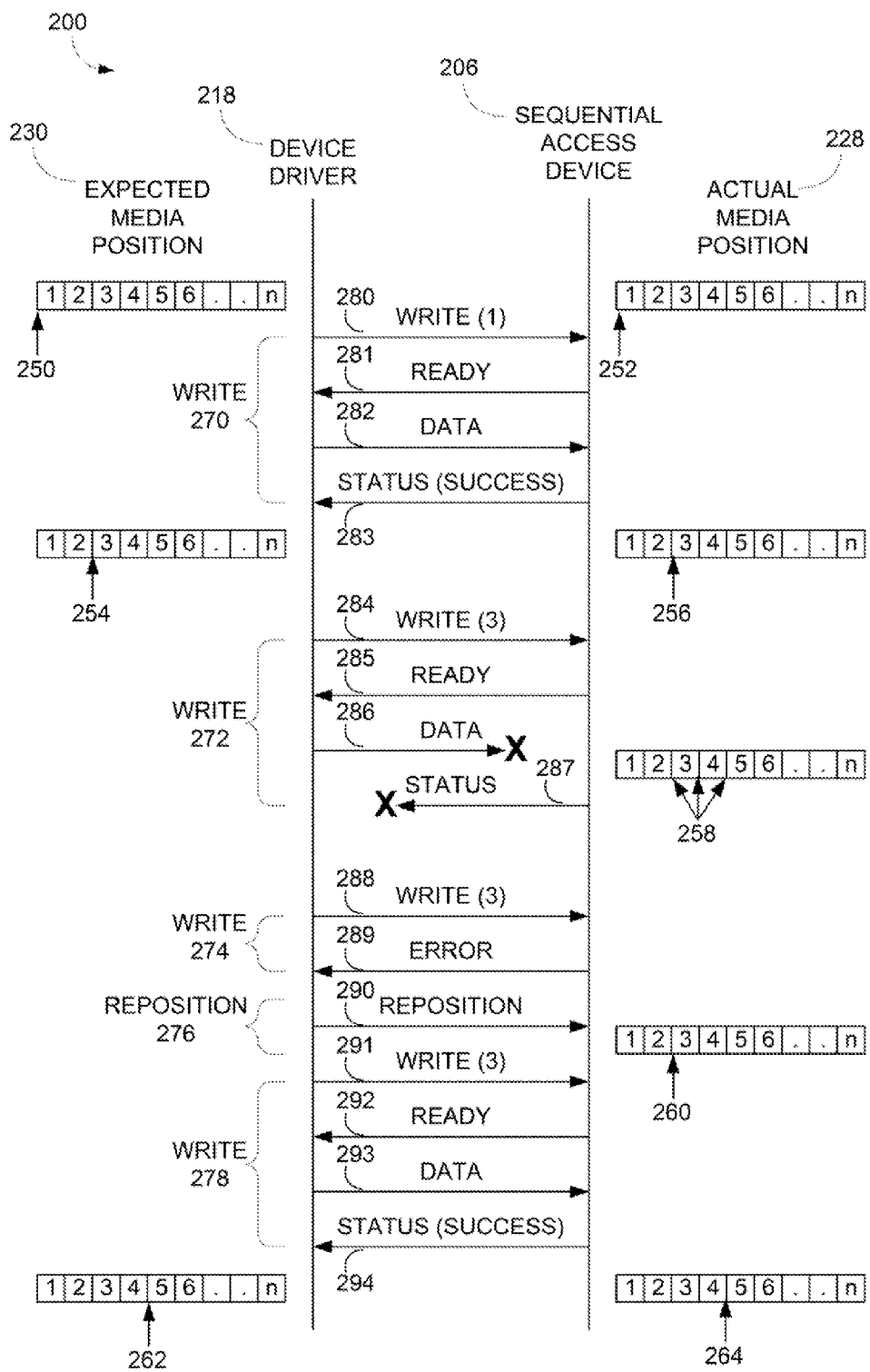
FIG. 2 is an example of a message sequence for recovering from a failure.

FIG. 2 is an example of a message sequence for recovering from a failure. Message sequence diagram 200 depicts an example sequence of messages that may be passed between a device driver 218 and a sequential access storage device 206. The messages shown in FIG. 2 may be sent over a network as was described with respect to FIG. 1. Diagram 200 also depicts an expected media position 230. The expected media position 230 is the device driver's 218 view of the current position of the media. Also shown is the actual media position 228 which reflects the actual position of the media.

For purposes of this description, the actual and expected media positions 228, 230 are shown as a series of numbers with an arrow pointing to the position of the media. For example, arrow 250 is shown as pointing to position one, indicating that the current expected media position 230 as viewed by the device driver 218 is position one. Likewise arrow 252 is also shown as pointing to position one, indicating that the media is actually currently located at position one.

The device driver 218 may send a command to the sequential access storage device 206 to instruct the sequential access storage device 206 to perform an operation. The term command is used to describe the operation that is being performed and is not intended to imply a single message is sent from the device driver 218 to the sequential access storage device 206. A single command may actually result in multiple messages being sent between the device driver 218 and the sequential access storage device 206 in order to complete the operation.

In order to understand the operation of the recovery mechanism, it may be helpful to first describe a command that has completed successfully. For example, the device driver 218 may wish to write data to the media. In order to do so, the device driver may issue a write command 270. As mentioned above, a single command may actually cause multiple messages to be exchanged. In this example, the write command may cause the device driver 218 to send a write message 280 to the sequential access storage device 206. Included in the write message 280, as shown in parenthesis, is the device driver's view of the expected media position 250. Upon receipt of the write message 280, the sequential access storage device 206 may compare the received expected media position with the actual media position 252. If the two positions are the same and the sequential access storage device 206 is otherwise ready to write the data it may send a ready message 281. The device driver 218 may then proceed to send the data in a data message 282. For purposes of this example, data message 282 will include two blocks of data.

The sequential access storage 206 device may then write the data received in the data message 282 to the media. After the data has been written, the sequential access storage device 206 may send a status message 283 to the device driver 218 indicating successful completion. The actual media position 256 now indicates that the media is at position three. This is not a calculated value, but it is the result of starting at position one 252 and then writing two blocks of data. After receiving the successful completion status message 283, the device driver may then calculate the new expected media position. The device driver previously believed the media was at position one 250, and is aware that it has just written two blocks of data, and as a result the new expected media position should be position three. The expected media position 254 is updated to reflect the result of this calculation.

A command that has failed will now be described. Device driver 218 may again wish to write two more blocks of data to the sequential access storage device 206 and may issue a write command 272. Just as above, a write message 284 including the expected media position 254 is sent to the sequential access storage device 206. The expected media position in the message is compared with the actual media position 256. Because these two positions match, a ready message 285 is sent. Upon receipt of the ready message, the device driver begins sending data 286 to the sequential access storage device. However, assume at some time after the ready message 285 is received there is a failure in the communications path between the device driver 218 and the sequential access storage device 206.

There are generally three possible outcomes. First, none of the data may have been received by the sequential access storage device 206 and therefore no data was written to the media. The media would remain at the initial position which in this case is position three. The second possibility is that all of the data is received and written, but the successful completion message 287 is not received. In this case, the actual media position would be the initial position plus the two blocks of data that were written. The resulting media position would be position five. The third possibility is that only some of the data is received and written. This would result in the actual media position being somewhere between positions three and five. As should be clear, the actual media position 258 is highly dependent on when exactly the failure occurred. Furthermore, the data that has been written to the media could range from none of the data to all of the data. These inconsistencies need to be resolved in such a way as to ensure that all the data has been written to the media and that no duplicate data is stored on the media.

The device driver 218 will realize that the command has failed when it does not receive the status message 287 from the sequential access storage device. For example, the device driver may timeout waiting for the status message. The device driver may then try to recover the command 272 that just failed. The device driver may first determine if an alternate communications path to the sequential access storage device is available. If so, the device driver may switch to the alternate communications path. However, even if no alternate communications path is available, the device driver may still try to recover the command over the original communications path in the hope that the failure on the original path was temporary.

The command recovery process may begin with issuing a new write command 274. Included in the write message 288 will be the last expected media position 254 before the failed command. The write message may be received by the sequential access storage device and the expected media position compared with the actual media position. There are two possible outcomes from this comparison. First, the expected media position matches the actual media position. This corresponds to the case above where no data was received before the failure. In this case, no additional steps are required. The sequential access storage device may send a ready message and the device driver may send the data again (not shown).

The second possible outcome is that the expected and actual media positions do not match. This will occur when at least a portion of the data was successfully written to the media and as such the actual media position is unknown by the device driver. It should be clear that it is not possible to simply resend the data because there would be no way to determine where the data will be written. Furthermore, simply resending the data may result in at least portions of the data being duplicated. For example, in the case where all of the data had been received and written, resending the data would result in two copies of the data being stored on the media. When the expected and actual media positions do not match, the sequential access storage device will send an error message 289 to the device driver indicating that there is a position mismatch.

The device driver may then issue a reposition command 276. The device driver may send a reposition message 290 which will instruct the sequential access storage device to reposition the media to the expected media position 254. The sequential access storage device may reposition the media to the desired location. As shown, the media is moved to position three 260. The device driver may issue another write command 278 which results in sending a write message 291 containing the expected media position 254 to the sequential access storage device. The sequential access storage device may compare the expected media position with the actual media position 260. Assuming the reposition command 276 was properly executed, the expected and actual media positions should now match.

The sequential access storage device may then send a ready message 292 to the device driver which in turn can begin sending the data 293 to the sequential access storage device. The sequential access storage device may write the data as it is received. Upon completion, the actual media position 264 will reflect the position of the media after the two blocks of data have been written. In this case, the actual media position would now be position five. The sequential access storage device may then send a successful completion message 294 to the device driver. Upon receiving the successful completion message 294 the device driver may calculate the new expected position by taking the initial expected media position 254 and adding the number of blocks of data that were sent. In this case, the initial expected media position was position three and two blocks of data were sent resulting in an expected media position of five. The device driver may then store the new expected media position 262. At this point the previously failed write command 272 has now been recovered.

In an alternate example implementation, the device driver 218 may skip an initial attempt to resend a command, and move directly to repositioning the media. For example, write message 284 resulted in a ready response 285, which indicates that the expected and actual media positions are currently the same. If the positions were not the same, the ready response would not have been sent. Thus, the device driver is aware that at the start of the write command 272, the media is properly positioned. Once the failure occurs, the device driver may skip resending the write command 274 and move directly to the reposition command 276. Thus, the device driver simply returns the media to a known position, without having to first issue write command 274, which may or may not result in an error.

The message sequence described in FIG. 2 only includes an expected media position in media access commands. As explained above, media access commands are those commands whose successful completion depends on the initial position of the media. As described, the write commands 270, 272, 274, 278 are media access commands, and thus include an expected media position. The reposition command 276 is not a media access command because the successful completion of the operation is not dependent on the initial position of the media. Thus the media reposition command 276 does not include the expected media position. However, it should be understood that in alternate example implementations, the expected media position may be included in all commands, even those which are not classified as media access commands.

In addition, the message sequence in FIG. 2 includes an expected media position in all media access commands. In a slightly different example implementation, the expected media position may only be included after a failure is detected. As shown, the write commands 270 and 272 both include the expected media position. However, during normal operation, it would be expected that the device driver 218 would be able to properly calculate the expected media position, thus there would be no reason for a position mismatch to occur. It is not until the communications failure during messages 286 or 287 that there is the possibility for a position mismatch to occur.

In the alternative implementation, the expected media position may only be included after an initial failure occurs. The sequential access storage device 206 may receive media access commands that do not contain an expected position and skip the comparison of the expected and actual media positions. Once the device driver 218 detects a failure, as occurred with write command 272, the expected media position can again be included in the subsequent media access commands.

Figure 3:
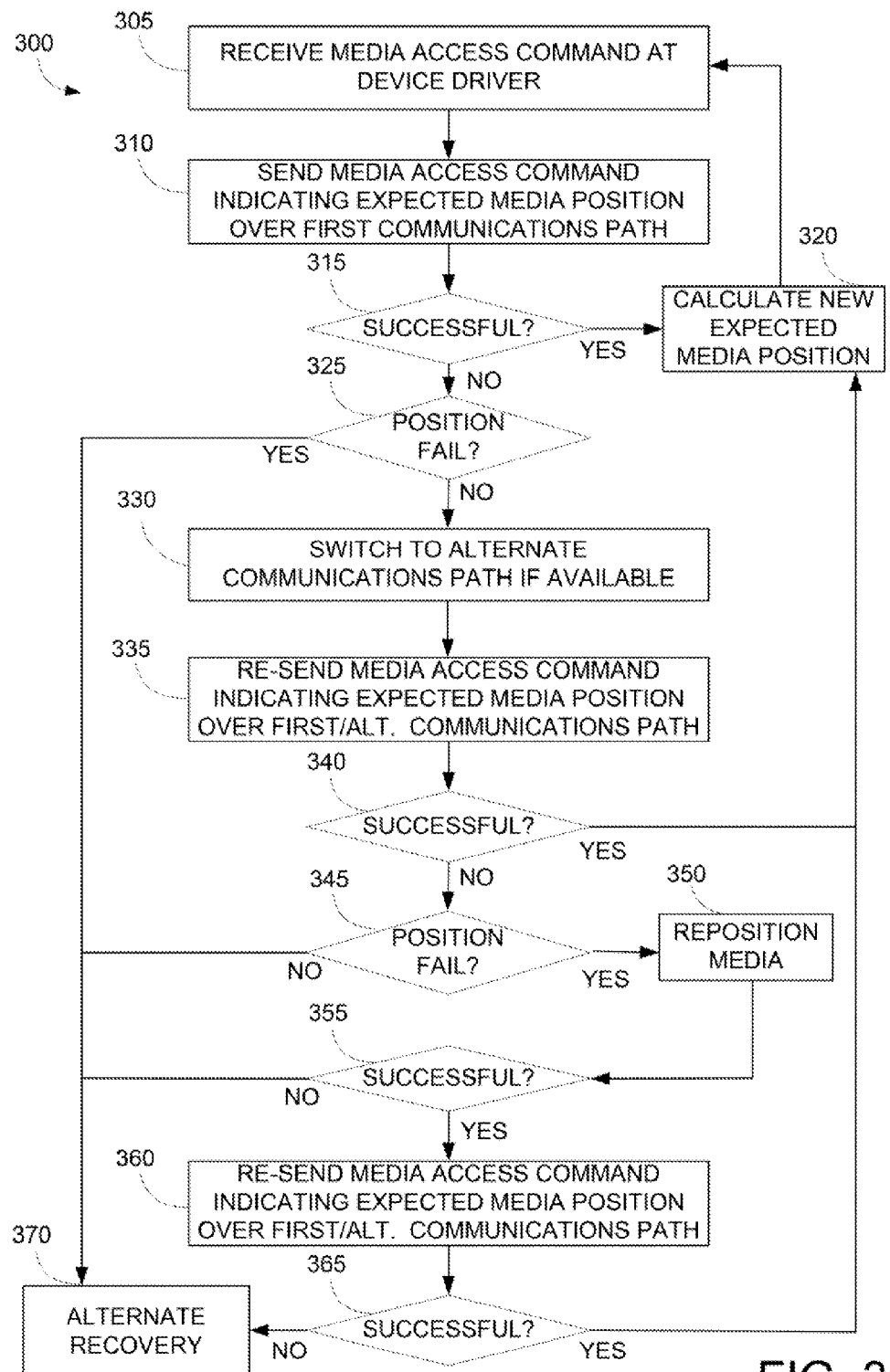
FIG. 3 is a high level flow diagram illustrating an example of recovering from a failure.

FIG. 3 is a high level flow diagram illustrating an example of recovering from a media access command failure. Flow diagram 300 may begin at block 305 in which a media access command is received at the device driver. As explained above, media access commands are those commands in which the success of the command depends on the media being in the correct position. In block 310 the media access command is sent to the sequential access storage device over a first communications path. Included in the media access command may be an indication of the expected media position as determined by the device driver.

In block 315 it is determined if the command sent in block 310 was successful. A successful command is one that is received by the sequential access storage device and is able to be processed by the device. If the command is successful, block 320 is executed in which the new expected media position is calculated. As explained above, the device driver is able to calculate the new expected position based on the completion of the command that was sent in block 310. The process returns to block 305 to await the next command.

If the command was not successful, it may be determined why the command was not successful. In block 325 it is determined if the failure was due to a mismatch between the expected and actual positions of the media. If the failure was due to a position mismatch it may be a type of failure that cannot be recovered by the device driver alone. The reason is that a position mismatch failure at this point may indicate that the media was moved outside of the control of the device driver, otherwise the device driver would have correctly calculated the expected position. The process moves to block 370 for alternate recovery, which will be described below.

If the failure was not due to a position mismatch, the process moves to block 330 where it is determined if an alternate communications path is available. If an alternate communications path is available, the device driver may switch to the alternate communications path. However, even if an alternate path is not available, it may still be useful to attempt the command again over the first communications path. For example, the command may have actually been received and executed by the sequential access storage device, but the response was lost. The response may have been dropped due to temporary congestion in the network that connects the device driver and the sequential access storage device. That temporary congestion may have now cleared.

In block 335 the command, including the expected media position, is resent to the sequential access storage device. In block 340, it is determined if the command was successful. If the command was successful the process moves to block 320 and proceeds as discussed above. If the command was not successful the process moves to block 345 to determine if the failure was due to a position mismatch. If the failure was not due to a position mismatch it is a type of failure that cannot be recovered by the device driver alone. The reason is that a position mismatch failure at this point indicates that the sequential access storage device has failed to process the command for some reason other than an incorrect media position. Recovery cannot be performed by repositioning the media. The process would then move to block 370 for alternate recovery, which will be described below.

If it is determined in block 345 that the failure was due to a position mismatch, the process moves to block 350. In block 350, a command may be sent to the sequential access storage device to reposition the media to the expected media position. In block 355 it is determined if the repositioning command sent in block 350 was successful. If the repositioning command was not successful it is a type of failure that cannot be recovered by the device driver alone. The process moves to block 370 for alternate recovery, which is described below.

If the repositioning command is successful, the process moves to block 360 where the command including the expected media position is resent to the sequential access storage device one more time. In block 365 it is determined if the command was successful. If the command was successful, the process moves to block 320 and proceeds as discussed above. Otherwise, it is a type of failure that cannot be recovered by the device driver alone. At this point, the media should be properly positioned and a failure indicates an error that is outside of the control of the device driver alone. The process moves to block 370 for alternate recovery.

In block 370 alternate recovery is performed. As discussed above, there are some cases where the device driver alone cannot recover a failed command. One simple example may be that the sequential access storage device has been completely disconnected from the network. No amount of sending and resending commands by the device driver will recover from this type of error. If block 370 is reached, some form of alternate recovery, such as reconnecting the sequential access storage device to the network, is needed.

Figure 4:
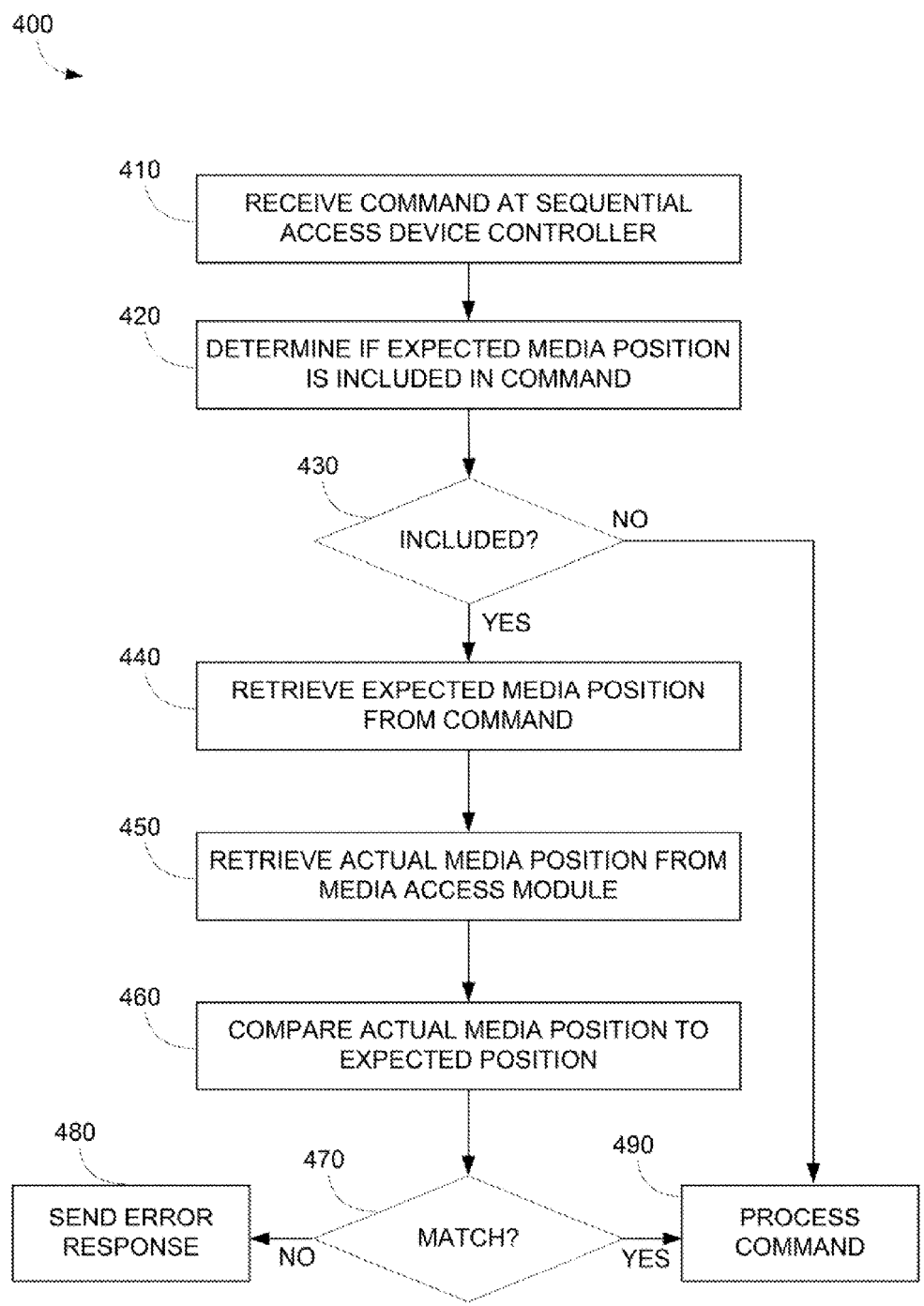
FIG. 4 is a high level flow diagram illustrating an example of the operation of a sequential access storage device.

FIG. 4 is a high level flow diagram illustrating an example of the operation of a sequential access storage device. Flow diagram 400 may begin at block 410 in which a command is received by the controller of a sequential access storage device. In block 420, it is determined if the command includes an expected media position. As has been described above, not all commands will include an expected media position. In some implementations, the expected media position is only included in commands that are classified as media access commands. In other implementations, the expected media position is only included after an initial failure.

In block 430, a decision is made based on the determination in block 420. If an expected media position is not included in the command, the process moves to block 490 which will be described below. If an expected media position is included in the command, the process moves to block 440. In block 440, the expected media position is retrieved from the command. In block 450 the actual media position is retrieved. In block 460 the actual and expected media positions are compared.

In block 470, a decision is made based on the comparison performed in block 460. If the actual and expected media positions do not match, there is an error. The process moves to block 480 where an error response is sent back to the source of the command. At this point processing by the sequential access storage device is complete and any recovery actions necessary will be performed by the source of the command.

If in block 470 it is determined that the actual and expected media positions do match, the process then moves to block 490. In block 490, the command is processed. The completion of the command depends on the command that is received and processing will proceed as needed. For example, data may be read or written, the media may be moved, or any number of other operations may be performed. If block 490 is reached, either the expected and actual media positions match or that the actual media position is not relevant to the command being performed. In either case, the command can be processed.

We claim:

1. A method comprising:
   including an expected media position in an access command sent from a device driver of a computer to a sequential access storage device, the expected media position calculated by the device driver; and
   receiving a response from the sequential access storage device indicating if the expected media position matches an actual media position.

2. The method of claim 1 wherein the response indicating a successful completion of the access command indicates matching expected and actual media positions.

3. The method of claim 1 further comprising:
   sending a media positioning command to the sequential access storage device if the response indicates the expected and actual media positions do not match; and
   reissuing the access command with the expected media position.

4. The method of claim 1 further comprising:
   recalculating, with the device driver, the expected media position upon successful completion of the access command based on the access command that was just completed.

5. The method of claim 1 further comprising:
   detecting a communications path failure between the computer and the sequential access storage device; and
   switching to an alternate communications path.

6. The method of claim 1 wherein the expected and actual media positions identify physical locations on the media.

7. The method of claim 1 wherein the expected and actual media positions represent logical locations on the media.

8. A non-transitory computer readable medium containing thereon a set of instructions which when executed by a computer cause the computer to:
   send an access command to a sequential access storage device over a first communications path;
   determine a failure of the access command; and
   resend the access command to the sequential access storage device over a second communications path, the access command including an expected media position, the expected media position calculated by a device driver.

9. The non-transitory medium of claim 8 further comprising instructions which cause the computer to:
   receive a response from the sequential access storage device over the second communications path indicating successful completion of the access command, wherein successful completion indicates the expected media position matches an actual media position.

10. The non-transitory medium of claim 8 further comprising instructions which cause the computer to:
    receive a response from the sequential access storage device over the second communications path indicating the expected media position does not match an actual media position;
    send a media positioning command to the sequential access storage device to position the media at the expected media position; and
    resend the access command to the sequential access storage device over the second communications path.

11. The non-transitory medium of claim 8 further comprising instructions which cause the computer to:
    calculate the expected media position based on successfully completed access commands.

12. The non-transitory medium of claim 8 further comprising, instructions which cause the computer to:
    include the expected media position in all commands.

13. A device comprising:
    a media access module; and
    a controller coupled to the media access module to receive access commands which include an expected media position, the expected media position calculated by a device driver, and to compare the expected media position with an actual position as indicated by the media access module.

14. The device of claim 13 wherein the controller responds with an error response if the expected and actual media positions are not the same.

15. The device of claim 13 wherein the device is a tape storage device.

16. The method of claim 1 wherein the expected media position is maintained by the device driver.

17. The method of claim 1 wherein the expected media position represents the device driver's view of a current position of media in the storage device.

18. The method of claim 1 wherein the expected media position is calculated by the device driver without further input from an application, operating system, and the storage device.

19. The method of claim 1 wherein calculating the expected media position is by adding an initial position plus a number of blocks of data just written to the storage device.

20. The device of claim 13 wherein the expected media position is maintained by the device driver.

* * * * *